(12) United States Patent
Shevick

(10) Patent No.: US 9,089,236 B2
(45) Date of Patent: *Jul. 28, 2015

(54) COMPRESSION MOUNT FOR WINDOW COVERINGS

(71) Applicant: Shades Unlimited, Inc., Cotati, CA (US)

(72) Inventor: Barry L. Shevick, Rancho Cordova, CA (US)

(73) Assignee: Shades Unlimited, Inc., Cotati, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,776

(22) Filed: Dec. 3, 2013

(65) Prior Publication Data

US 2014/0084122 A1 Mar. 27, 2014

Related U.S. Application Data

(63) Continuation of application No. 10/966,279, filed on Oct. 15, 2004, now Pat. No. 8,596,594.

(51) Int. Cl.
*A47H 1/00* (2006.01)
*A47H 1/18* (2006.01)
*E06B 9/50* (2006.01)
*F16M 13/02* (2006.01)
*E06B 9/40* (2006.01)

(52) U.S. Cl.
CPC .. *A47H 1/18* (2013.01); *E06B 9/50* (2013.01); *F16M 13/02* (2013.01); *E06B 2009/402* (2013.01); *E06B 2009/407* (2013.01)

(58) Field of Classification Search
USPC ............. 248/254, 266–271, 257–259, 200.1; 160/178.1 V, 178.1 R, 902, 903, 107; 211/41.8, 41.9
See application file for complete search history.

(56) References Cited

U.S. PATENT DOCUMENTS

| | | | | |
|---|---|---|---|---|
| 1,049,485 A | * | 1/1913 | Hoyt | 160/263 |
| 1,233,884 A | * | 7/1917 | Kraemer | 160/263 |
| 2,110,048 A | * | 3/1938 | May | 160/300 |
| 2,974,805 A | * | 3/1961 | Brossean | 211/105.5 |
| 3,110,506 A | * | 11/1963 | O'Brien | 410/151 |
| 5,688,087 A | * | 11/1997 | Stapleton et al. | 410/150 |
| 6,694,543 B2 | * | 2/2004 | Moore | 4/610 |
| 6,807,780 B2 | * | 10/2004 | McCahill et al. | 52/220.8 |
| 7,128,124 B2 | * | 10/2006 | Bibby et al. | 160/263 |

* cited by examiner

*Primary Examiner* — Steven Marsh
(74) *Attorney, Agent, or Firm* — Heisler & Associates

(57) ABSTRACT

A compression mount assembly is provided for securing a window covering to a window frame by compression forces between vertical sides of the window frame on opposite sides of the window. A housing is coupled to the window covering and a slide translates linearly within a cavity in the housing away from the housing to abut the side of the window frame. A driver, such as a spring, is located between the slide and the housing to urge the slide away from the housing. A trigger is provided which holds the slide adjacent the housing, until the trigger is activated by pushing a button to release the slide from the housing and allow the slide to translate away from the housing. A fixed end cap is provided for an end of the window covering opposite the compression mount assembly and for abutting against an opposite side of the window frame.

20 Claims, 6 Drawing Sheets

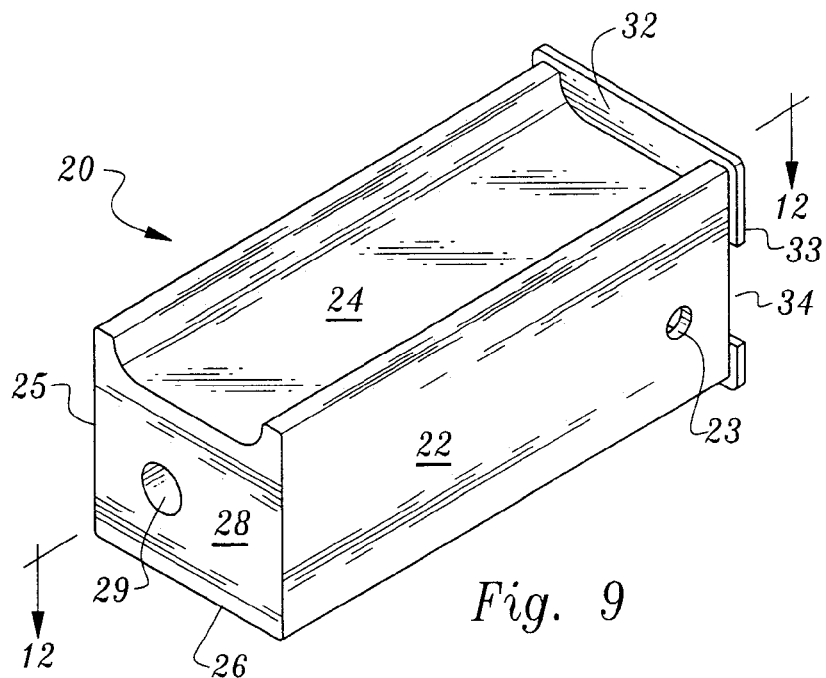
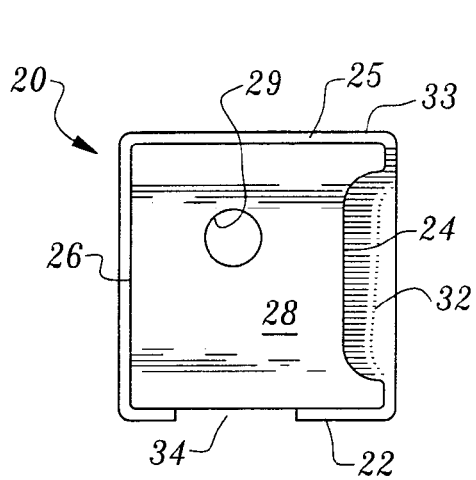
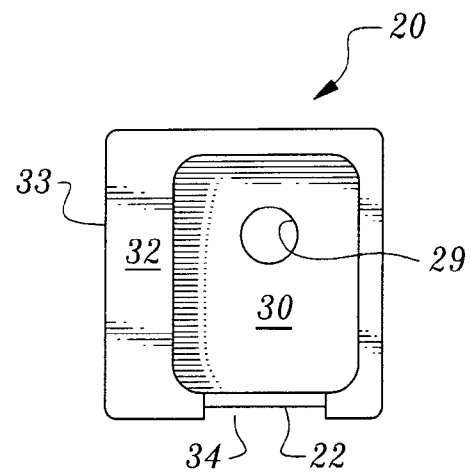
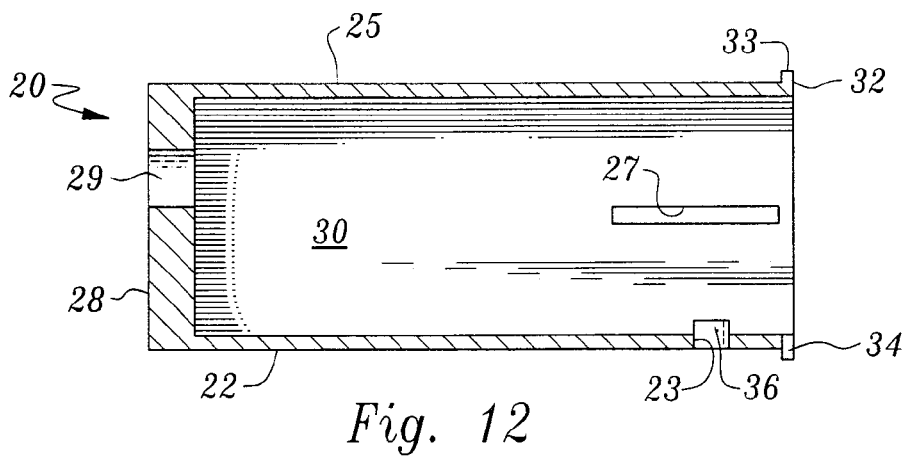

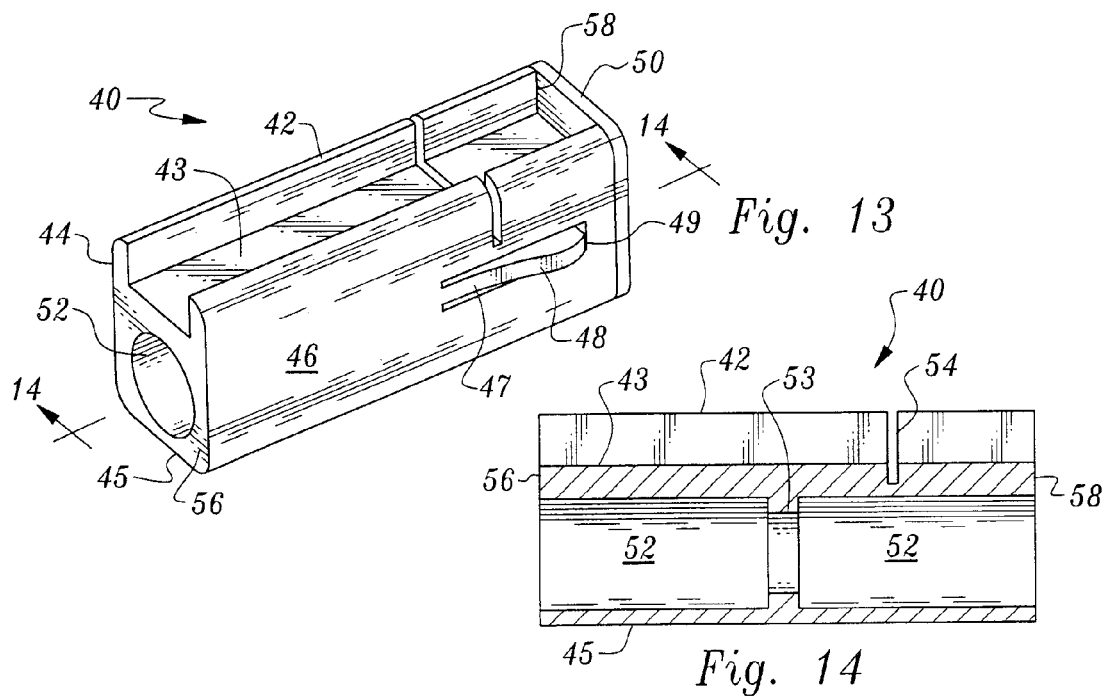
Fig. 13
Fig. 14
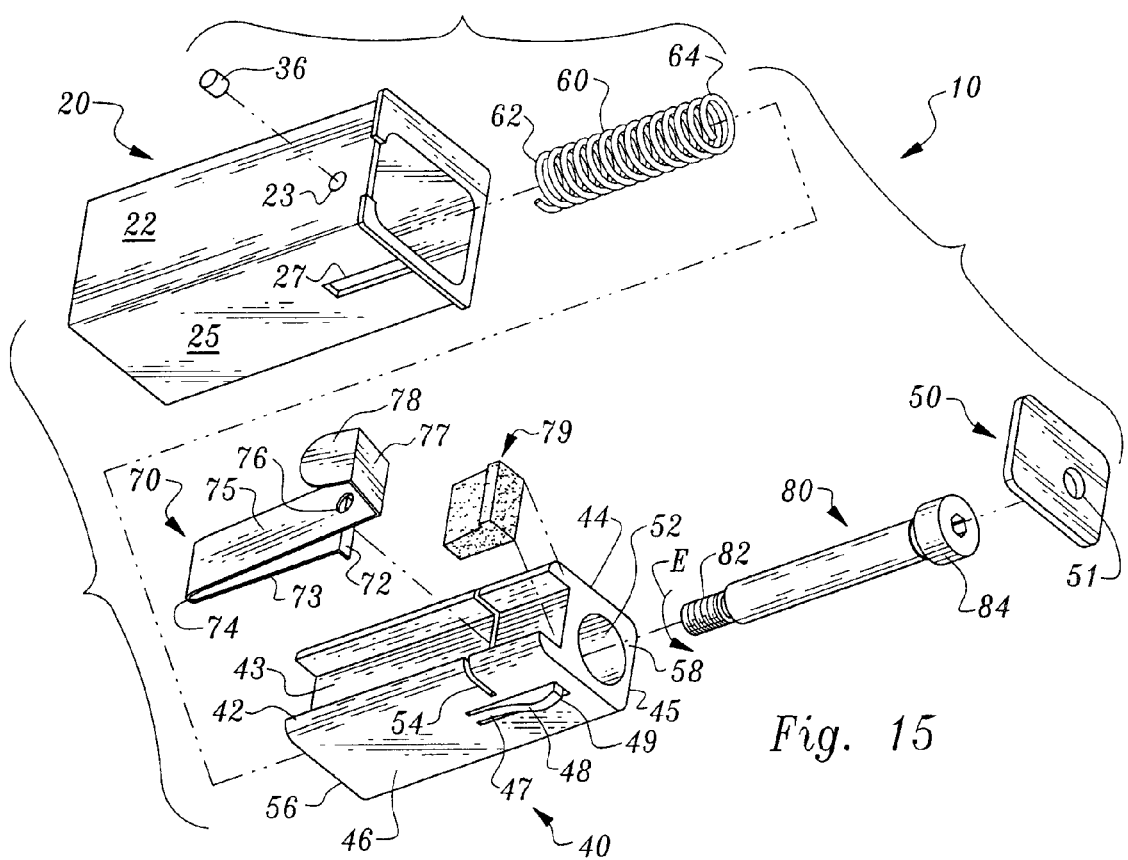
Fig. 15

COMPRESSION MOUNT FOR WINDOW COVERINGS

CROSS-REFERENCE TO RELATED APPLICATIONS

This application is a continuation of U.S. patent application Ser. No. 10/966,279 filed on Oct. 15, 2004 and issued as U.S. Pat. No. 8,596,594 on Dec. 3, 2013.

FIELD OF THE INVENTION

The following invention relates to mounting assemblies for mounting window coverings to a window frame surrounding a window. More particularly, this invention relates to window covering mounting assemblies and methods which rely upon compression forces exerted laterally away from ends of the window coverings against vertical sides of the window frame, and associated friction forces, to keep the window covering in place.

BACKGROUND OF THE INVENTION

Window coverings of various different configurations are provided to control the amount of light passing through a window, to selectively allow or preclude viewing through the window, and generally to decorate the window. Often windows are surrounded by a frame including a horizontal lintel above vertically oriented sides. It is often desirable that a top rail of a window covering be mounted to the window frame directly below the lintel and between the vertical sides of the window frame. Such mounting has heretofore been generally difficult to achieve requiring a relatively high level of skill and moderately complex mounting hardware. In particular, brackets are typically provided which are fastened with screws or other fasteners to either the lintel or the vertical sides of the window frame directly below the lintel. Installation of the mounting brackets is sufficiently difficult that many home owners choose to utilize window covering installation professionals, rather than performing the installation themselves.

Some attempts to avoid the requirement of installing mounting brackets or similar hardware have only achieved limited success. For instance, the patent to Schumacher (U.S. Pat. No. 5,158,127) teaches utilizing adhesive to secure a top rail of a window covering to the undersurface of the lintel of the window frame. Such mounting is generally only effective for particularly lightweight window coverings.

Another attempt to avoid mounting hardware is illustrated by the window shade roller assembly taught by Barettella (U.S. Pat. No. 4,373,569). While Barettella is somewhat effective, the Barettella assembly must necessarily limit compression mounting forces to forces which can be readily exerted by the user installing the window covering. The user of the Barettella invention is not able to hold the ends of the assembly away from the window frame sides for desired positioning without exerting forces on the ends during the entire positioning procedure until the final position for the shade has been selected. Also, the Barettella window shade roller assembly is not readily adapted to facilitating resizing of a length of the window shade roller assembly to fit the particular width of the window in which the window shade is to be mounted.

Accordingly, a need exists for a window covering mounting system which avoids the use of specialized mounting hardware, and which can be easily and readily positioned precisely where desired by a homeowner having limited strength and still securely support window coverings of various different weights where desired within the window frame.

SUMMARY OF THE INVENTION

This invention provides a compression mount assembly which allows a window covering to be easily mounted between vertical sides of a window frame without requiring the use of mounting hardware. After the window covering has been cut to proper width (slightly less than a width between vertical sides of the window frame), a compression mount assembly according to this invention is coupled to at least one end of the window covering. The compression mount assembly generally includes a housing portion coupled directly to the end of the top rail of the window covering and a slide portion. The housing includes a cavity extending into an interior of the housing. The slide resides within the cavity and is allowed to translate linearly relative to the housing within the cavity. The slide has an outer side which extends out of the cavity slightly and near a vertical side of the window frame when the top rail of the window covering is positioned horizontally between spaced vertical sides of the window frame.

A driver is interposed between the slide and the housing, with the driver preferably in the form of a spring. The driver is deactivated by a trigger so that the slide is held within the cavity and away from the vertical side of the window frame. When the trigger is actuated, the slide is released from the housing and the spring or other driver exerts a force on the slide pushing the slide out of the cavity in the housing until the outer side of the slide abuts the sidewall of the window frame. The spring or other driver exerts sufficient force upon the slide, and the outer side of the slide has a sufficient coefficient of friction that the entire window covering is held securely to the window frame. Preferably, an end of the top rail opposite where the compression mount assembly is located is fitted with a fixed end cap. The fixed end cap includes a face which abuts a vertical sidewall of the window frame opposite where the slide of the compression mount assembly engages the side of the window frame. The fixed end cap and compression mount assembly thus act together to secure the window covering to the window frame without requiring the installation of mounting hardware.

The trigger is preferably in the form of a lever which has an eye therein which selectively engages and disengages a pin extending laterally into the cavity from a sidewall of the cavity. The lever is coupled to the slide so that when the eye of the lever engages the pin in the housing, the driver is restrained by having the slide held to the housing. When the trigger is actuated, such as by pushing a button on the lever, the eye of the lever moves off of the pin in the cavity wall of the housing, allowing the spring or other driver to act on the slide and push the slide at least partially out of the cavity, away from the housing and into engagement with the side of the window frame.

The driver and trigger can be further disabled by a finger in the slide being aligned within a slit in the housing so that the slide cannot move relative to the housing until the finger is depressed. The finger is configured so that it will not be depressed until the housing is slid into the tubular top rail of the window covering. This tubular sleeve of the top rail depresses the finger and enables the trigger. Then, when the trigger is activated, such as by pushing the button on the lever, the slide is driven by the driver away from the housing and into engagement with the side of the window frame.

OBJECTS OF THE INVENTION

Accordingly, a primary object of the present invention is to provide a mounting apparatus for a window covering to allow a window covering to be mounted to a window frame without requiring the installation of mounting hardware into the window frame.

Another object of the present invention is to provide a window covering mount which is easy to use in mounting a window covering.

Another object of the present invention is to provide a mounting apparatus for a window covering which allows the window covering to be precisely located where desired by a user.

Another object of the present invention is to provide a mounting apparatus which can be readily disengaged and reengaged with a window frame without damaging the window frame or leaving visible marks on the window frame.

Another object of the present invention is to provide a mounting apparatus for window coverings which readily accommodates cutting of the window covering to proper size.

Another object of the present invention is to provide a mounting apparatus for window coverings which securely holds the window covering to the window frame without risk of falling, for light and heavy window coverings.

Another object of the present invention is to provide a mounting apparatus for window coverings which exerts a compression force greater than an amount of force which the user can easily exert.

Another object of the present invention is to provide a mounting assembly for window coverings which is disabled until the mounting apparatus has been placed into an end of a top rail of the window covering.

Another object of the present invention is to provide a mounting apparatus for window coverings which is not activated until a trigger is actuated by a user.

Another object of the present invention is to provide a method for mounting window coverings which is easy to execute and reliably holds the window covering in the desired position.

Another object of the present invention is to provide a mounting assembly which is readily manufacturable from commonly available materials and which can exhibit reliable performance.

Other further objects of the present invention will become apparent from a careful reading of the included drawing figures, the claims and detailed description of the invention.

BRIEF DESCRIPTION OF THE DRAWINGS

FIG. 9 is a perspective view of a housing portion of the compression mount assembly of this invention shown alone.

FIG. 10 is an elevation view of a closed end of the housing of the FIG. 9.

FIG. 11 is an elevation view of an open end of the housing of FIG. 9.

FIG. 12 is a full sectional view of that which is shown in FIG. 9, taken along line 12-12 of FIG. 9.

FIG. 13 is a perspective view of a slide portion of the compression mount assembly of this invention shown alone.

FIG. 14 is a full sectional view of the slide of FIG. 13 taken along line 14-14 of FIG. 13.

FIG. 15 is an exploded parts view of the compression mount assembly of this invention.

DESCRIPTION OF THE PREFERRED EMBODIMENT

Figure 4:
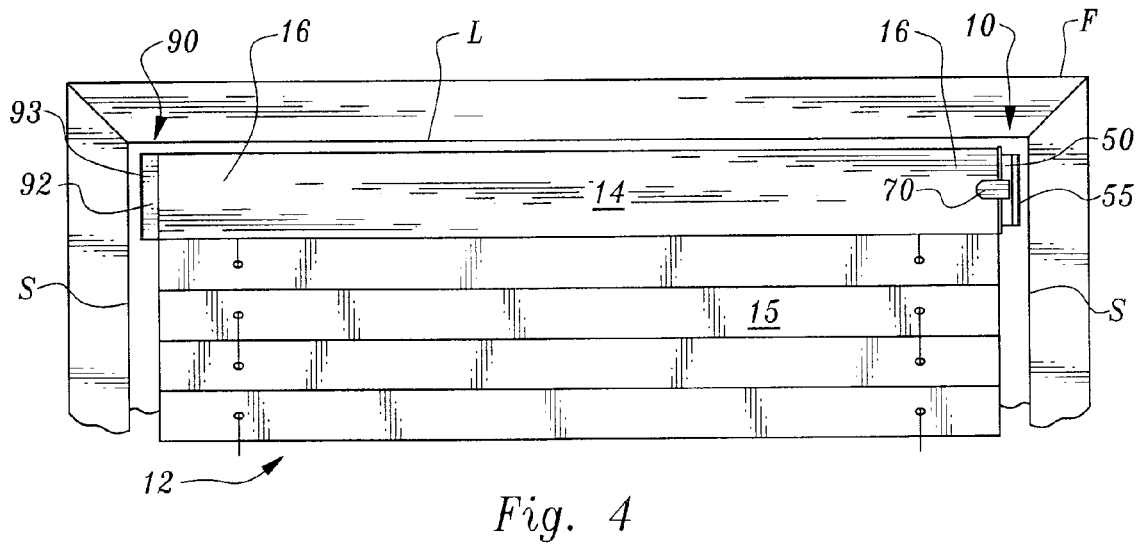
FIG. 4 is a front elevation view of a window covering with the compression mount assembly of this invention and fixed end cap of this invention installed upon the window covering, just before utilization of the compression mount assembly.

Referring to the drawings, wherein like reference numerals represent like parts throughout the various drawing figures, reference numeral 10 is directed to a compression mount assembly (FIG. 1) for holding a shade 12 or other window covering adjacent a window frame F (FIG. 4). The compression mount assembly 10 fits within at least one end 16 of a top rail 14 of the shade 12. When the compression mount assembly 10 is activated, a slide 40 extends linearly out of the compression mount assembly 10 to abut a vertical side S of the window frame F with sufficient force to hold the entire shade 12 through the top rail 14 to the window frame F. Thus, no attachment hardware need be installed into the window frame F for mounting the shade 12 or other window covering adjacent the window frame F.

Figure 1:
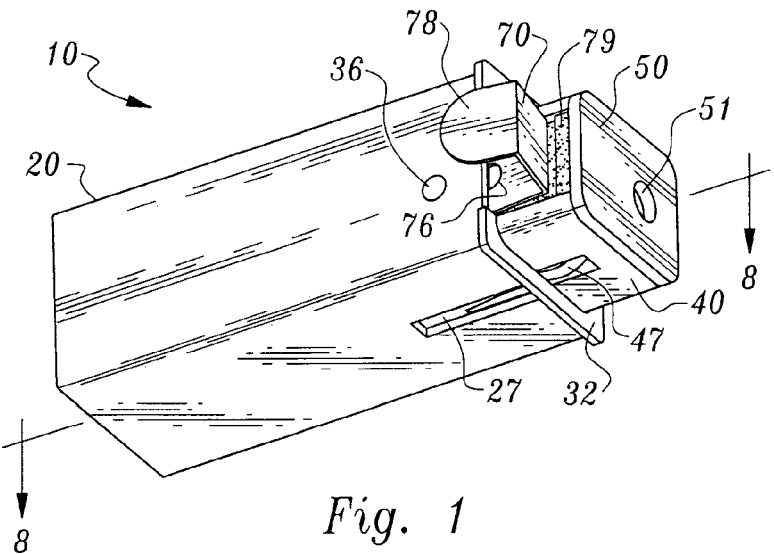
FIG. 1 is a perspective view of the compression mount assembly of this invention with a slide portion of the compression mount assembly located partially out of a cavity in a housing portion of the assembly.

In essence, and with particular reference to FIG. 1, basic details of the compression mount assembly 10 are described. The compression mount assembly 10 includes a housing 20 defining an outer periphery of the compression mount assembly 10. The housing 20 includes a cavity 30 (FIGS. 5-8) extending along an elongate axis of the housing 20 and open at one side of the housing 20 defined by a rim 32. A slide 40 is sized and shaped to fit within the cavity 30 with part of the slide 40 inside the cavity 30 and part of the slide 40 extending out of the cavity 30. A spring 60 defines a preferred form of driver interposed between the housing 20 and the slide 40. The spring 60 is oriented to exert a force on the slide 40 tending to push the slide 40 out of the cavity 30 and away from the housing 20.

A lever defines a preferred form of trigger which is attached to the slide 40. The lever 70 is somewhat flexible in a direction lateral to a direction of slide 40 travel. The lever 70 includes an eye 76 therein. One lateral wall of the cavity 30 includes a pin 36 extending into the cavity 30 in a lateral direction. The pin 36 is sized to engage the eye 76 and lever 70 so that the pin 36 holds the eye 76, and associated lever 70 and slide 40 in position within the cavity 30 of the housing 20. The lever 70 can be flexed so that the eye 76 moves off of the pin 36, so that the spring 60 or other driver is activated to push the slide 40 out of the cavity 30 of the housing 20. A central shaft 80 is aligned with a center of the spring 60 and is attached to a portion of the cavity 30 opposite the rim 32. The shaft keeps the spring 60 in alignment and includes a head 84 which acts as a stop to prevent slide 40 motion too far out of the cavity 30 of the housing 20.

A fixed end cap 90 is preferably provided for an end 16 of the top rail 14 of the shade 12 opposite where the compression mount assembly 10 is located. The fixed end cap 90 is thus adapted to abut a vertical side S of the frame F opposite where the compression mount assembly 10 engages the side S of the frame F so that the shade 12 is held securely between opposite facing vertical sides S of the frame F.

Figure 2:
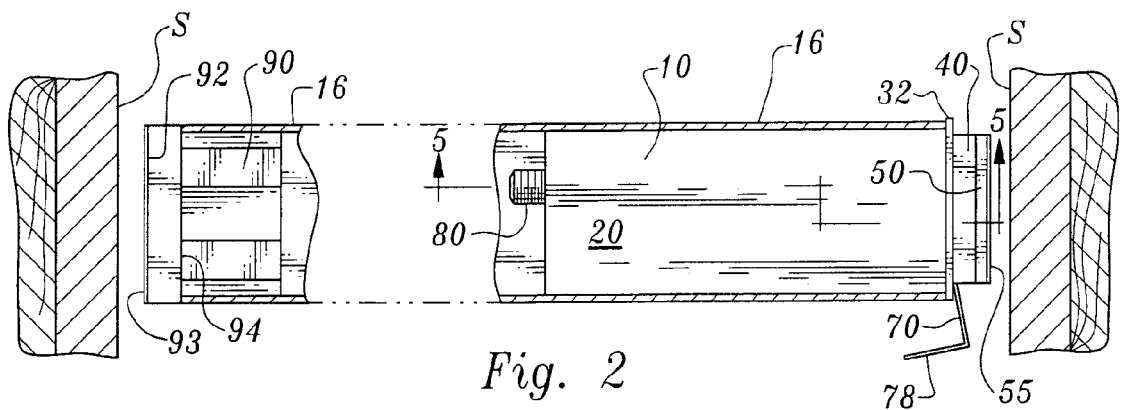
FIG. 2 is a full sectional view of a window covering including the compression mount assembly of this invention and the fixed end cap of this invention in place upon the window covering just before utilization of the compression mount assembly to secure the window covering to vertical sides of the window frame.
Figure 3:
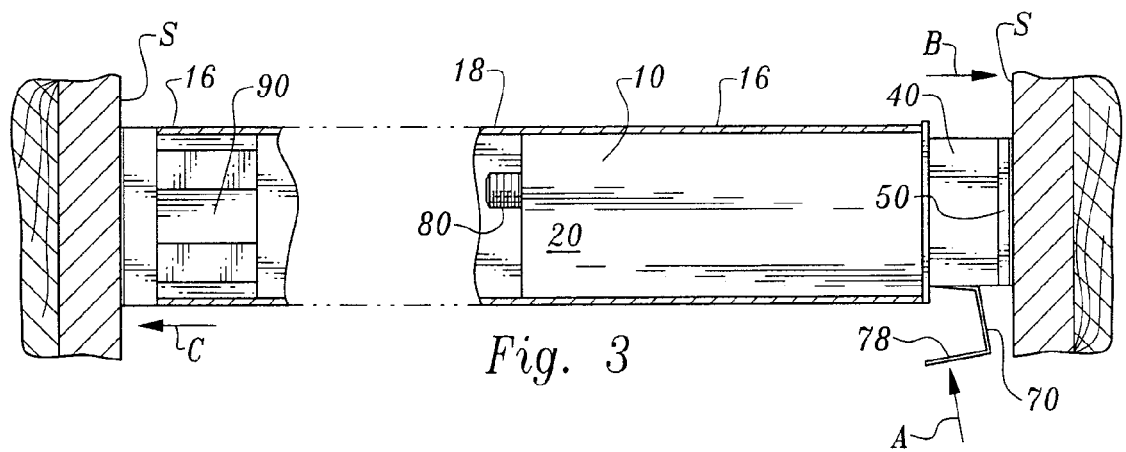
FIG. 3 is a full sectional view similar to that which is shown in FIG. 2, but after activation of a driver of the compression mount assembly, driving the slide out of the cavity in the housing and into engagement with the vertical side of the window frame.

More specifically, and with particular reference to FIGS. 2-4, details of the window frame F to which the compression mount assembly 10 and fixed end cap 90 act, are described. The window frame F defines a series of surfaces surrounding a window. The window frame F particularly includes a lintel L defining a horizontal downwardly facing surface adjacent an uppermost portion of a window. A pair of sides S are oriented in parallel vertical planes perpendicular to the lintel L and extending down from the lintel L. Together the lintel L and sides S define the portions of the window frame F to which the shade 12 or other window covering is mounted through action of the compression mount assembly 10 and the fixed end cap 90.

The shade 12 or other window covering can be any type of window covering which generally requires that the shade 12 or other window covering be suspended from an uppermost portion of the shade 12 or other window covering. In the case of the shade 12 of the preferred embodiment, a top rail 14 is provided from which a fabric 15 is suspended. The top rail 14 includes ends 16 with portions of the top rail 14 adjacent the ends 16 generally configured as a hollow tube 18 in the nature of a thin relatively rigid wall of material such as plastic or lightweight metal. The top rail 14 has the compression mount assembly 10 and fixed end cap 90 installed therein at opposite ends 16 (FIGS. 2-4) before installation of the top rail 14 of the shade 12.

In one form of the invention, the shade 12 or other window covering is adjustable in length to be custom sized to fit windows of different sizes. Initially the window is measured between the two vertical sides S of the frame F. The tube 18 forming the top rail 14 is then cut adjacent each of the ends 16 so that sufficient material is cut away from the top rail 14 to give the top rail 14 a length slightly less than a distance between the vertical sides S of the window frame F. The compression mount assembly 10 and fixed end cap 90 are then installed by nesting into the tube 18 at each of the ends 16 of the shade 12 and the compression mount assembly 10 is ready for use.

While the top rail 14 is typically installed just below the lintel L, the top rail 14 can be installed lower and spaced below the lintel L wherever desired. If the lintel L is arched, the top rail 14 can be installed between any substantially parallel portions of the sides S of the frame F. Some windows are not in vertical walls, such as skylights. With such windows, the compression mount assembly 10 of this invention can still be used with the top rail 14 and any other parts of a shade assembly required to hold the window covering in place. The sides S of the frame F to which the ends 16 of the top rail 14 abut are typically oriented in vertical planes, parallel with each other. However, the compression mount assembly 10 can work on a top rail 14 or other structure and any two generally parallel surfaces facing each other, without vertical orientation being strictly required.

Figure 5:
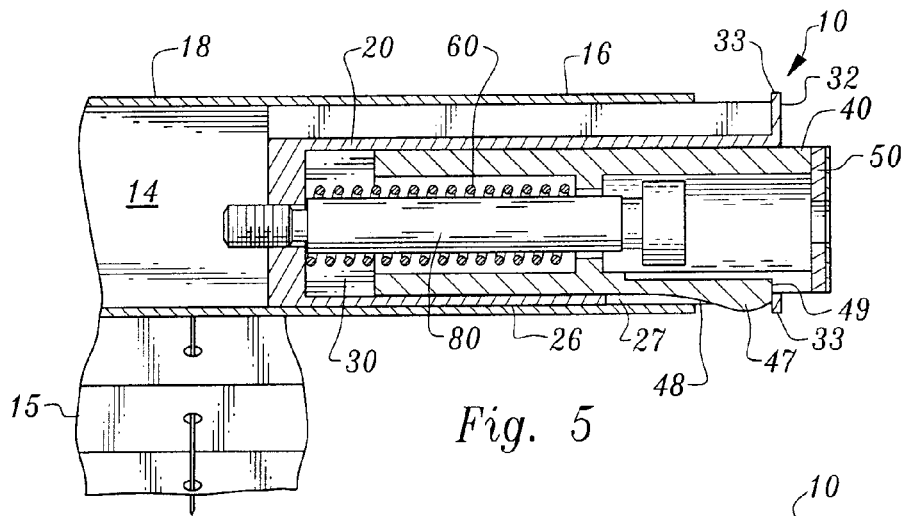
FIG. 5 is a sectional view of the compression mount assembly as it is being installed into an end of a top rail of a window covering, taken along line 5-5 of FIG. 2.
Figure 6:
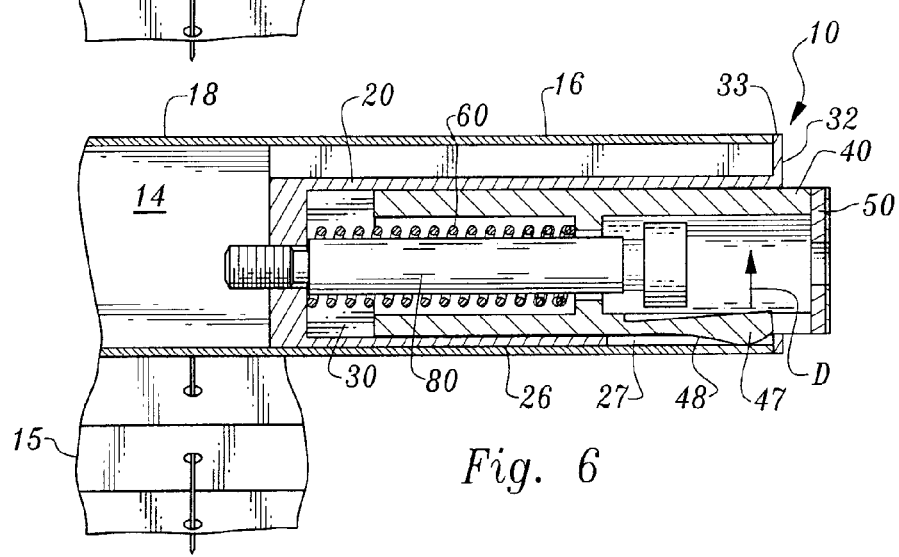
FIG. 6 is a sectional view similar to that which is shown in FIG. 5, but after the compression mount assembly has been installed entirely within the end of the top rail of the window covering.

With particular reference to FIGS. 9-12, particular details of the housing 20 of the compression mount assembly 10 are described. The housing 20 is preferably a rigid construct formed of metal, such as aluminum, or a hard plastic or composite material. The housing 20 exhibits a generally orthorhombic shape with a cross-section generally similar to that of an interior of the tube 18 of the shade 12, so that the housing 20 can nest within the tube 18 adjacent one of the ends 16 of the shade 12 (FIGS. 5 and 6). The housing 20 includes a front 22 parallel with and spaced from a rear 25. The front 22 includes a hole 23 passing from an exterior of the front 22 into the cavity 30 within the housing 20.

A top 24 is provided generally parallel with and spaced from a bottom 26. Both the top 24 and bottom 26 generally extend between the front 22 and rear 25. The top 24 preferably includes a somewhat recessed surface to assist in allowing the housing 20 to slide easily into one of the ends 16 of the tube 18 of the shade 12.

The bottom 26 includes a slit 27 (FIGS. 1, 12 and 15) which provides a portion of a means to disable the trigger for the compression mount assembly 10, as described in detail below. The slit 27 is located on the bottom 26 at a position thereon most distant from an end 28 which is perpendicular to the front 22, top 24, rear 25 and bottom 26. A threaded bore 29 passes through the end 28 and into the cavity 30 inside the housing 20. The threaded bore 29 functions to hold a portion of the shaft 80, as described in detail below.

The housing 20 preferably has a hollow interior defined by the cavity 30. A rim 32 on a portion of the housing 20 opposite the end 28 defines an opening leading into the cavity 30 within the housing 20. The cavity 30 preferably has a substantially constant cross-section along an entire length of the cavity 30. The cavity 30 is preferably generally quadrilateral in cross-section from the end 28 to the rim 32.

The rim 32 preferably includes a lip 33 which extends away from a central axis of the cavity 30 and the housing 20. The lip 33 extends slightly beyond the front 22, top 24, rear 25 and bottom 26. A gap 34 is provided in a portion of the lip 33 adjacent the front 22 of the housing 20. The lip 33 acts as a stop when the housing 20 is nested within an end 16 of the tube 18, with the lip 33 abutting the extreme end 16 of the tube 18 when the housing 20 is entirely within the tube 18. The gap 34 provides clearance for passage of a portion of the lever 70 out of the cavity 30 and to a location outside of the housing 20, but very close to the extreme end 16 of the tube 18 of the shade 12 (FIG. 4).

The hole 23 in the front 22 of the housing 20 is fitted with a pin 36. The pin 36 is preferably press fit within the hole 23 and has a length greater than a wall thickness of the front 22 between an exterior of the housing 20 and the cavity 30. The pin 36 is located so that it is flush with the front 22 and extends laterally into the cavity 30. The pin 36 is thus available to engage the eye 76 in the lever 70 to hold the slide 40 within the cavity 30 of the housing 20, until the lever 70 or other trigger is actuated by pushing the lever 70 so that the eye 76 moves off of the pin 36, as described further below.

The housing 20 of this preferred embodiment acts as a preferred form of a first element coupleable to a window covering for supporting a second element, such as the slide 40 in a moving relationship relative to the first element. While the housing 20 is shown completely surrounding the cavity 30, the housing 20 or other first element could have other configurations and still provide the basic function of supporting the slide 40 or other second element in sliding relation relative to the housing 20 or other first element. While the cavity 30 is shown with a quadrilateral cross-section, the cavity 30 could have a circular or oval cross-section, or other geometric cross-section and still accommodate slides 40 of corresponding or non-corresponding cross-sectional shape, provided that sufficient lateral support is provided for the slide 40 so that the slide 40 generally moves primarily linearly into and out of the cavity 30.

With particular reference to FIGS. 13 and 14, particular details of the slide 40 of the compression mount assembly 10 are described. The slide 40 defines a preferred form of the second element which slides relative to the housing 20 or other first element and which abuts the side S of the window frame F when the trigger of the assembly 10 is activated. The slide 40 is a preferably rigid unitary mass of material formed of a substantially hard, but somewhat flexible material, such as nylon, delerin, or other plastic material having suitable performance characteristics to achieve the functions described herein for the slide 40. The slide 40 is generally orthorhombic in shape and generally sized and shaped to fit within the cavity 30 and facilitate linear translation of the slide 40 within the cavity 30 along a central long axis of the cavity 30 and the slide 40. The slide 40 thus includes a forward side 42 generally parallel within and opposite a back side 45. The slide 40 also includes an upper side 44 parallel with and opposite a lower side 46, with the upper side 44 and lower side 46 generally perpendicular to the forward side 42 and back side 45. The forward side 42 preferably includes a trough 43 therein extending longitudinally along the forward side 42. The trough 43 defines a space in which the lever 70 or other trigger can reside for the compression mount assembly 10.

The lower side 46 includes a finger 47 formed therein. The finger 47 is formed to have an attached end opposite a free end. The finger 47 further has an outer surface defined by a slope 48 which slopes progressively away from the plane in which the lower side 46 is oriented up to a tip 49 where the finger 47 is truncated at the free end thereof. With the material forming the slide 40 being slightly resilient, the configuration of the finger 47 allows the finger 47 to flex inwardly and outwardly somewhat about the attached end of the finger 47.

The finger 47 has a width similar to, but slightly less than a width of the slit 27 of the housing 20. Also, a position of the finger 47 on the slide 40 is such that the finger 47 fits within the slit 27 in the housing 20 when the slide 40 is in an innermost position within the cavity 30 of the housing 20. The tip 49 of the finger 47 is adapted to abut against an end of the slit 27 adjacent the rim 32 and lip 33 of the cavity 30. This tip 49 thus abuts the rim 32 and lip 33 so that the slide 40 is effectively disabled so that the slide 40 cannot translate out of the cavity 30 of the housing 20 when the finger 47 is still located within the slit 27.

Because the finger 47 includes the slope 48, the finger 47 can be relatively easily flexed inwardly so that the tip 49 no longer engages the rim 32 and lip 33 of the housing 20 adjacent the slit 27. As shown in FIGS. 5 and 6, when the compression mount assembly is slid into the end 16 of the tube 18, the extreme end 16 of the tube 18 slides against the slope 48 of the finger 47. As the housing 20 is nested entirely within the tube 18, the wall of the tube 18 pushes on the slope 48 sufficiently so that the tip 49 is released from engagement against the rim 32 and lip 33 (by pivoting of the finger 47 along arrow D of FIG. 6).

Thus, the slide 40 and associated trigger is disabled when the slide 40 is loaded entirely within the cavity 30 of the housing 20 and when the housing 20 is not located within the tube 18 of the shade 12. However, when the housing 20 of the compression mount assembly 10 is located within the tube 18 of the shade 12, the finger 47 is flexed (along arrow D of FIG. 6) so that the trigger is thus enabled and ready to function.

The slide 40 is not released from the cavity 30 of the housing 20 by placing of the housing 20 within the tube 18, but rather is placed in condition so that actuation of the trigger can occur to allow the slide 40 to translate linearly out of the cavity 30 of the housing 20. If desired, multiple fingers 47 can be utilized around various different sides of the slide 40 with corresponding slits in the housing 20.

The finger 47 and slit 27 together provide a preferred form of a means to disable the trigger of the compression mount assembly 10. Other trigger disabling mechanisms could alternatively be provided, including removable structures which hold the lever 70 or other trigger mechanism in a locked position until such structures are removed, or other forms of finger-like structures which restrain the lever 70 or other trigger from movement, or restrain the slide 40 from movement within the cavity 30 of the housing 20, until the housing 20 has been nested within the tube 18 of the shade 12. The trigger disabling means beneficially guards against premature actuation of the trigger and translation of the slide 40 out of the cavity 30 of the housing 20, until such movement is desired.

The slide 40 preferably also includes a cap 50 at an end of the slide 40 provided for abutting the vertical side S of the frame F. The cap 50 can be formed along with other portions of the slide 40, but preferably is provided as a separate piece fixed to the slide 40 to facilitate forming of a central bore 52 passing entirely through a center of the slide 40. A port 51 passes through the cap 50 and allows a tool, such as an allen wrench, to pass through the cap 50 and act upon a head 84 of the shaft 80 located within the central bore 52 within the slide 40.

The central bore 52 is preferably cylindrical in form with a constant cross-sectional diameter, except at a neck 53 generally at a midpoint of the central bore 52 and oriented perpendicular to a central axis of the central bore 52. The neck 53 defines a shelf extending inwardly from walls of the central bore 52 and generally dividing the central bore 52 and the slide 40 into an inner side 56 and an outer side 58. The inner side 56 is that portion of the slide 50 which is more completely within the cavity 30 of the housing 20, and the outer side 58 is that portion of the central bore 52 and slide 40 which is at least partially out of the cavity 30 of the housing 20.

The neck 53 provides a ledge against which one end of the spring 60 or other driver can act. The neck 53 also provides a surface against which the head 84 of the shaft 80 can rest, to prevent the slide 40 from translating further than a maximum amount of desired slide 40 translation relative to the housing 20.

Figure 7:
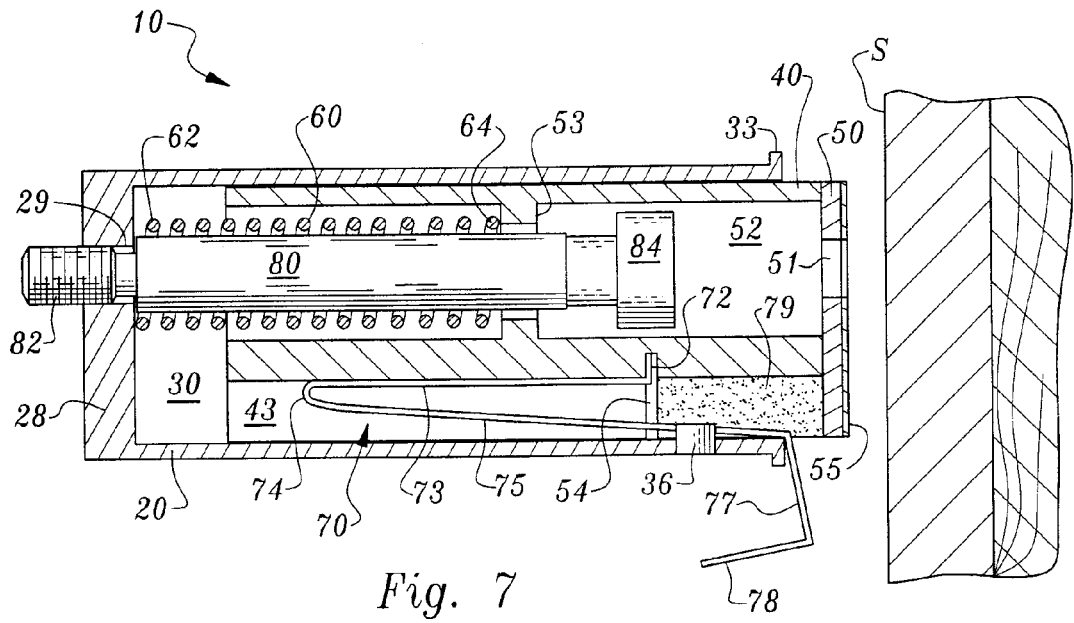
FIG. 7 is a full sectional view of the compression mount assembly of this invention prior to activation of the driver to drive the slide against the vertical side of the window frame.
Figure 8:
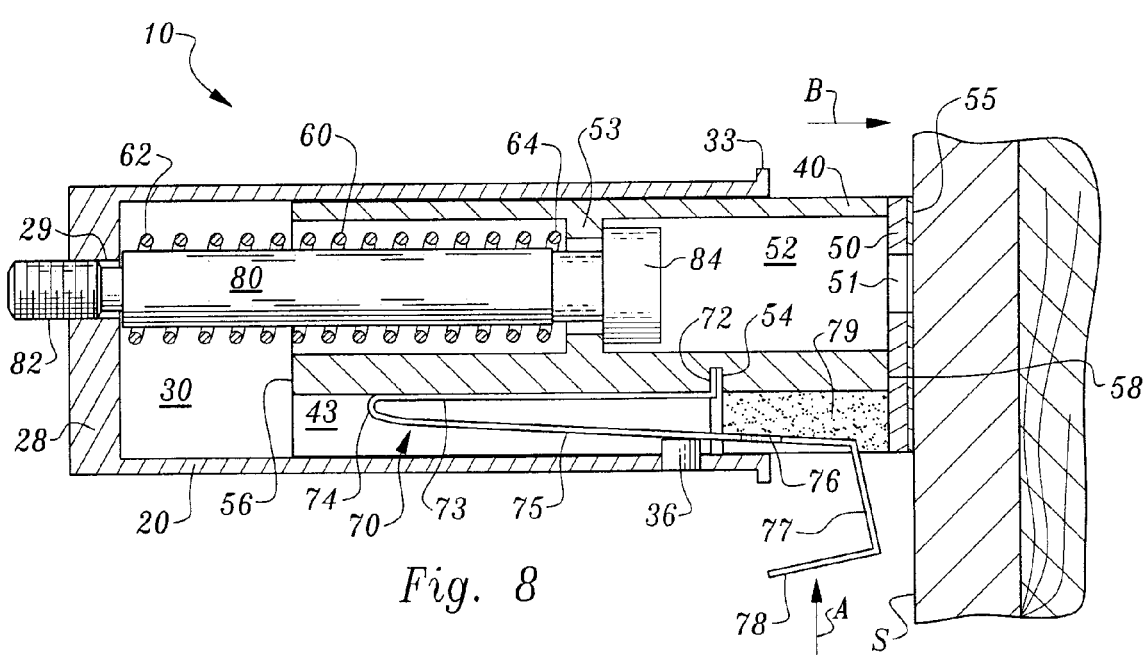
FIG. 8 is a full sectional view similar to that which is shown in FIG. 7 but after the driver has been activated and the slide driven into engagement with the vertical side of the window frame, taken along line 8-8 of FIG. 1.

A groove 54 slices laterally into the forward side 42 of the slide 40, but preferably not entirely into the central bore 52. This groove 54 acts with a portion of the lever 70 to hold the lever 70 so that it moves with the slide 40, as described in detail below. Preferably, the cap 50 has a surface thereof which is fitted with an adhesive 55, preferably with the adhesive 55 located upon an at least somewhat resilient pad of material. The adhesive 55 enhances a coefficient of friction between the cap 50 and a vertical side S of the window frame F (FIGS. 7 and 8). As an alternative, or in addition to the adhesive 55, prongs or other structures can be provided on the cap 50 which are designed to embed themselves at least partially into the vertical side S of the window frame F, to further enhance engagement of the cap 50 of the slide 40 with the vertical side S of the window frame F.

With particular reference to FIG. 15, details of the spring 60, lever 70 and shaft 80 are described. The spring 60 provides a preferred form of driver for exerting a force on the slide 40, pushing the slide 40 or other second element away from the housing 20 or other first element, such as at least partially out of the cavity 30 of the housing 20. As an alternative to the spring 60, other forms of means to bias the slide 40 away from the housing 20 could be utilized, such as highly resilient materials, or hydraulic or pneumatic chambers, as well as springs of various different types and configurations.

Most preferably, the spring 60 is a helical linear compression spring extending between a housing end 62 and a slide end 64. The housing end 62 is particularly adapted to abut the end 28 of the housing 20 where the end 28 defines a wall of the cavity 30 opposite the rim 32. The slide end 64 of the spring 60 preferably abuts a side of the neck 53 facing the end 28 of the cavity 30. Because the neck 53 is located within the central bore 52, portions of the central bore 52 between the neck 53 and the inner side 56 of the slide 40 support the spring 60 and keep the spring 60 linearly aligned, with a long axis of the spring 60 generally colinear with a long axis of the cavity 30 and slide 40.

Additionally, the spring 60 is preferably kept aligned by a shaft 80 passing through a center of the spring 60. The shaft 80 includes a threaded tip 82 which threads into the threaded bore 29 at the end 28 of the housing 20. The shaft 80 extends linearly from the threaded tip 82 to the head 84. The head 84 has a diameter slightly greater than that of the neck 53 of the slide 50. Thus, the head 84 resides on a side of the neck 53 of the slide 40 closer to the outer side 58 of the slide 40 than to the inner side 56 of the slide 40.

The head 84 can be accessed through the port 51 in the cap 50, such as with an allen wrench or other torque applying tool, to allow the shaft 80 to rotate with the threaded tip 82 engaging with the threaded bore 29 of the housing 20. If the shaft 80 is rotated sufficiently, the threaded tip 82 can be removed from the threaded bore 29, and the entire slide 40 allowed to be removed from the cavity 30 of the housing 20.

When the shaft 80 is positioned with the threaded tip 82 engaging threads within the threaded bore 29, the shaft 80 acts to hold the slide 40 within the cavity 30 of the housing 20 at least partially. As the shaft 80 is rotated (opposite arrow E of FIG. 15), an amount of travel allowed by the slide 40 relative to the housing 20 is reduced. When the shaft 80 has the threaded tip 82 rotated a maximum distance into the threaded bore 29, a least amount of slide 40 travel is accommodated. If a greater amount of slide 40 travel is desired to be allowed, the shaft 80 is rotated (about arrow E of FIG. 15) a desired amount to provide the desired amount of slide 40 travel relative to the housing 20.

The lever 70 defines a preferred form of trigger or other means to selectively activate and deactivate motion of the slide 40 relative to the housing 20 and selectively control function of the compression mount assembly 10. The lever 70 is preferably formed of spring steel (or generally similar material) and is configured to move with the slide 40 during operation of the compression mount assembly 10. The lever 70 preferably includes a tooth 72 at one end which fits within the groove 54 in the slide 40 to keep the lever 70 coupled to the slide 40, particularly restraining any linear motion of the lever 70 relative to the slide 40 in the direction of slide 40 travel.

The tooth 72 transitions into a first arm 73 extending substantially parallel with the tooth 72 and within the trough 43 of the slide 40. The bend 74 transitions the first arm 73 to the second arm 75 which is nearly parallel with the first arm 73, but slightly angled away from the first arm 73. The bend 74 is such that the second arm 75 can be flexed toward the first arm 73 and away from the first arm 73 in a somewhat spring-like fashion.

The eye 76 is formed within the second arm 75 and at a position on the second arm 75 which allows the eye 76 to engage the pin 36 extending laterally inwardly from the wall of the cavity 30 (FIGS. 7 and 8). The second arm 75 is longer than the first arm 73, and extends to a location near the cap 50 of the slide 40, where the second arm 75 transitions into a flange 77 nearly perpendicular with the second arm 75. A button 78 defines a final bend of approximately 90° away from the flange 77.

The button 78 faces a user when the compression mount assembly 10 is installed on a window shade 12 (FIG. 4), so the user can easily push on the button 78 and in turn push the second arm 75 and associated eye 76 off of the pin 36 so that the spring 60 or other driver is released and activated to push the slide 40 partially out of the cavity 30 and away from the housing 20. Such sliding stops when the neck 53 of the slide 40 abuts the head 84 of the shaft 80, or most preferably, when the cap 50 of the slide 40 fully engages the vertical side S of the window frame F.

A resilient mass 79 is preferably located within the trough 43 between the forward side 42 of the slide 40 and the second arm 75 of the lever 70. The resilient mass 79 assists in keeping the second arm 75 and associated eye 76 in engagement upon the pin 36, unless sufficient force is applied to the button 78 to compress the resilient mass 79, and flex the second arm 75 toward the first arm 73 to push the eye 76 off of the pin 36.

Figure 16:
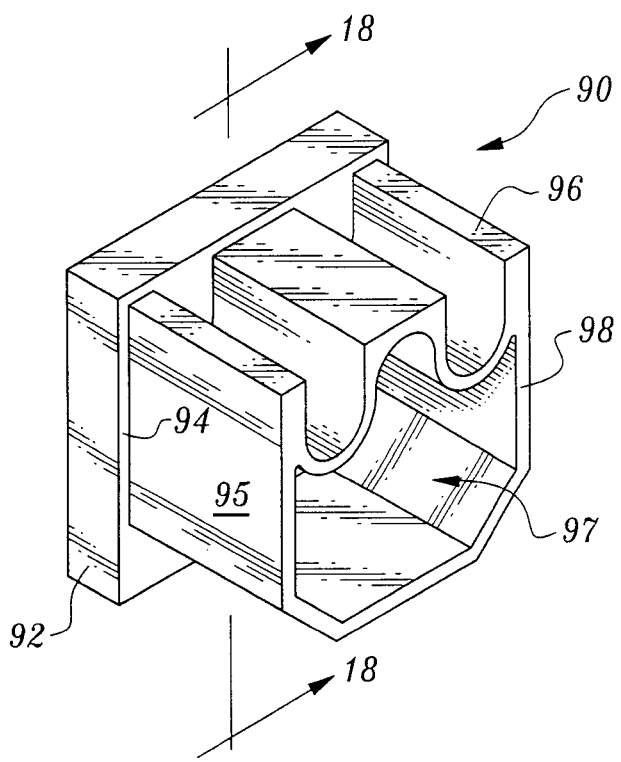
FIG. 16 is a perspective view of the fixed end cap for use with the compression mount assembly of this invention.
Figure 17:
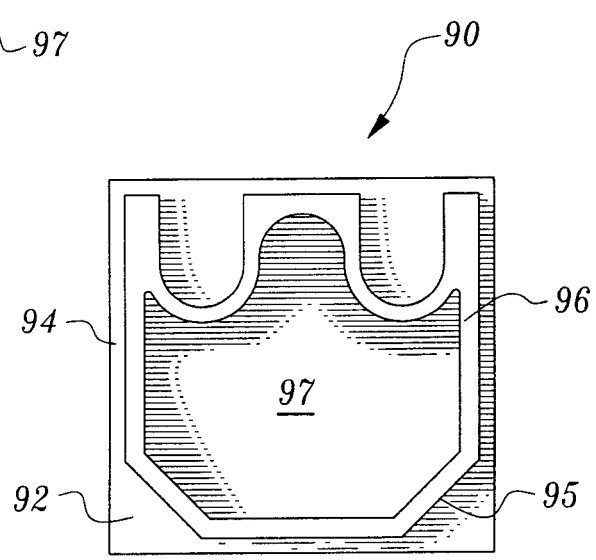
FIG. 17 is an end elevation view of that which is shown in FIG. 16.
Figure 18:
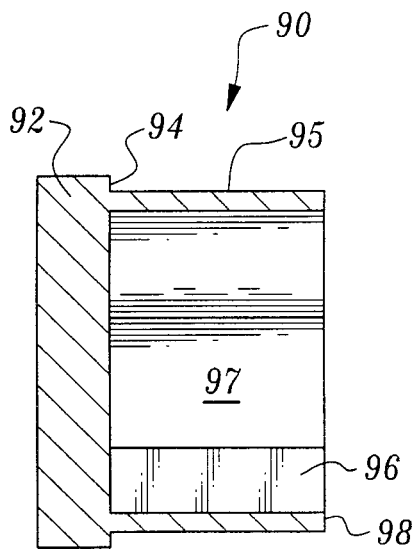
FIG. 18 is a full sectional view of that which is shown in FIG. 16, taken along line 18-18 of FIG. 16.

With particular reference to FIGS. 16-18, details of the fixed end cap 90 are described. The fixed end cap 90 is conveniently provided so that only a single compression mount assembly 10 is required for mounting of the shade 12 or other window covering. As an alternative to the fixed end cap 90, a pair of compression mount assemblies 10 could be utilized at opposite ends 16 of the top rail 14 of the shade 12. This fixed end cap 90 could be replaced with an adjustable end cap which would be adjustable in length to allow fine tuning of the length of the combination of the shade 12, compression mount assembly 10 and adjustable end cap. For instance, a threaded coupling could be utilized so that rotation of the threaded coupling would adjust slightly a width of portions of such an adjustable end cap.

With the fixed end cap 90, a face 92 is provided generally similar to the cap 50, such that it can support an adhesive 93 thereon (FIGS. 2-4). Most preferably, as with the cap 50, the face 92 supports the adhesive 93 upon a resilient pad or layer, such as a soft foam material. Such pads help to cause the face and associated adhesive to maximize surface contact with the sides S of the frame F to maximize friction forces holding up the top rail 14. The pads are particularly helpful if the sides S of the frame F have a rough texture or uneven surface blemishes that might otherwise compromise surface contact.

The face 92 is coupled through a shoulder 94 to a nesting portion 95. The nesting portion 95 is sized to fit within an end 16 of the tube 18 in the top rail 14 of the shade 12 in a manner generally similar to nesting of the housing 20 within the tube 18. This nesting portion 95 has a lesser width than that of the face 92, such that the shoulder 94 abuts the extreme end 16 of the tube 18 where the fixed end cap 90 is installed. The nesting portion 95 generally includes walls 96 perpendicular to the face 92. A recess 97 is located inboard of the walls 96, with the walls terminating at an edge 98 most distant from the face 92. The walls 96 and recess 97 are adapted so that the nesting portion 95 can exhibit a friction fit within the tube 18, so that the fixed end cap 90 remains in position when placed within the tube 18.

In use and operation, and with particular reference to FIGS. 2, 3, 7 and 8, details are described of the operation of the compression mount assembly 10 for mounting a shade 12 or other window covering horizontally between vertical sides S of a window frame F. As discussed above, after the compression mount assembly 10 has been nested entirely within one of the ends 16 of the tube 18 forming the top rail 14 of the shade 12, the trigger of the compression mount assembly 10 is enabled by compression of the finger 47 out of the slit 27, so that the compression mount assembly 10 is ready for use.

The shade 12 is then positioned so that the top rail 14 is precisely where the user desires it to be located, and with the face 92 of the fixed end cap 90 and the cap 50 of the slide 40 directly adjacent portions of the vertical sides S of the window frame F. With the shade 12 precisely in the position where mounting is desired, the user pushes the button 76 of the lever 70 (along arrow A of FIGS. 3 and 8). When the button 76 is pushed, the second arm 75 and associated eye 76 move off of the pin 36, so that the trigger has been actuated. Nothing is resisting the spring 60 or other driver from pushing the slide 40 out of the cavity 30 within the housing 20. Thus, the spring 60 or other driver drives the slide 40 linearly out of the cavity 30 (along arrow B of FIGS. 3 and 8).

This movement of the slide 40 continues until the cap 50 abuts the vertical side S of the frame F. Simultaneously, compression forces push the shade 12 to which the housing 20 is coupled away from this side S of the window frame F, so that the face 92 of the fixed end cap 90 is pushed against the vertical side S of the window frame F adjacent the fixed end cap 90 (along arrow C of FIG. 3). With the cap 50 of the slide 40 abutting the vertical side S of the window frame F, vertical friction forces are provided for suspending the shade 12 in this position.

Particularly, friction forces are defined as the force perpendicular to the vertical side S of the window frame F multiplied by the coefficient of friction between the cap 50 and the vertical side S of the window frame F. By utilizing the adhesive 55 or other friction enhancing structures, a coefficient of friction is enhanced. Other coefficient of friction enhancements can include placing the adhesive 55 upon a resilient pad, so that maximum surface area for engagement between the cap 50 and the side S of the window frame F is provided.

Friction forces can be further enhanced by increasing a spring force of the spring 60, or otherwise increasing the force provided by the driver urging the slide 40 away from the housing 20. If such driver forces are so great that they would tend to damage the material forming the sides S of the window frame F, an overall area of the cap 50 where the cap 50 engages the side S of the window frame F, and where the face 92 of the fixed end cap 90 engages the side S of the window frame F, can be increased, so that these forces are spread out over a larger area.

If a user wishes to reposition the shade 12, the top rail 14 of the shade 12 is merely pushed toward the vertical side S of the window frame F which has the compression mount assembly 10 adjacent thereto, with sufficient force to overcome the force provided by the driver, such as the spring 60. In this way, the spring 60 or other driver is compressed, until the lever 70 or other trigger is reengaged, such as by having the eye 76 again located over the pin 36 extending into the cavity 30 of the housing 20. Once the lever 70 or other trigger is so reactivated, the shade 12 can be easily moved to any new position, or moved to a different window frame F, and the installation procedure described above can be repeated. If a distance between the cap 50 and the side S of the window frame F is too great, adjustment can be made by rotating the shaft 80, and increasing an amount of travel of the slide 40 relative to the housing 20.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A compression mount for a top rail of a window covering, comprising in combination:
    a housing with a cavity therein, said housing adapted to be coupled to an end of the top rail of the window covering;
    a slide sized to fit within said cavity and adapted to translate within said cavity;
    said slide having an inner side opposite an outer side with said inner side located deeper into said cavity than said outer side, said outer side adapted to abut a side of a window frame;
    a driver located between said housing and said slide, said driver adapted to apply a force tending to push said slide out of said cavity when said driver is activated;
    a trigger, said trigger adapted to activate said driver, when said trigger is activated, said trigger holding said slide to said housing until said trigger is activated, such that said slide and said housing move together before trigger activation;
    said driver having a compressed form and an extended form, said compressed form existing before said trigger is activated and said extended form existing after said trigger is activated, with said compressed form corresponding with said slide located deeper into said cavity than said extended form; and
    said trigger holding said driver in said compressed form until said trigger is activated.

2. The compression mount of claim 1 wherein said housing substantially completely surrounds lateral sides of said cavity.

3. The compression mount of claim 2 wherein said cavity has a substantially constant cross-sectional shape and size.

4. The compression mount of claim 3 wherein said cavity has a quadrilateral shaped cross-section.

5. The compression mount of claim 1 wherein said housing includes an exterior cross-section sized to be able to fit within an end of a tube forming the top rail of the window covering.

6. The compression mount of claim 5 wherein said housing includes a rim at an end thereof with a lip defining an edge of said rim, said lip having a greater width than a width of said tube, such that said lip abuts the end of the tube without passing within the tube forming the top rail of the window covering.

7. The compression mount of claim 1 wherein said driver includes a spring located between said housing and said slide.

8. The compression mount of claim 1 wherein said outer side of said slide includes an adhesive on a portion of said outer side of said slide adapted to abut the side of the window frame, such that a coefficient of friction between said slide and the side of the window frame is enhanced.

9. The compression mount of claim 1 wherein said outer side of said slide includes at least one prong on a portion of said outer side of said slide adapted to abut the side of the window frame, said prong adapted to embed itself at least partially into the side of the window frame.

10. A selectively activatable mounting apparatus for a window covering, to mount the window covering within a window frame, the mounting apparatus comprising in combination:
- a first element adapted to be coupled to at least one end of the window covering;
- a second element adapted to abut the window frame;
- said second element adapted to translate linearly relative to said first element and toward the window frame;
- a driver located between said first element and said second element;
- a trigger, said trigger adapted to activate said driver, said trigger holding said first element to said second element until said trigger is actuated, such that said first element and said second element move together before trigger actuation;
- said driver adapted to apply a force tending to push said second element away from said first element when said driver is activated when said trigger is actuated;
- said driver having a compressed form and an extended form, said compressed form existing before said trigger is activated and said extended form existing after said trigger is activated, with said compressed form corresponding with said first element located closer to said second element than said extended form; and
- said trigger holding said driver in said compressed form until said trigger is activated.

11. The mounting apparatus of claim 10 wherein said driver includes a means to bias said second element away from said first element when said driver is activated.

12. The mounting apparatus of claim 11 wherein said driver includes a spring located between said first element and said second element.

13. The mounting apparatus of claim 10 wherein said trigger includes a means to selectively hold said first element adjacent said second element.

14. The mounting apparatus of claim 10 wherein said first element is a housing with a cavity therein and said second element is a slide sized to fit within said cavity and adapted to translate within said cavity, said slide having an inner side opposite an outer side with said inner side located deeper into said cavity than said outer side, said outer side adapted to abut the window frame.

15. The mounting apparatus of claim 10 wherein said outer side of said second element includes an adhesive on a portion of said outer side of said second element adapted to abut the side of the window frame, such that a coefficient of friction between said second element and the side of the window frame is enhanced.

16. The mounting apparatus of claim 10 wherein said outer side of said second element includes at least one prong on a portion of said outer side adapted to abut the side of the window frame, said prong adapted to embed itself at least partially into the side of the window frame.

17. The mounting apparatus of claim 10 wherein a third element is adapted to be coupled to an end of the window covering opposite said first element, with said third element adapted to abut a portion of the window frame opposite where said second element abuts the window frame.

18. The mounting apparatus of claim 17 wherein said third element includes an adhesive thereon and said second element includes an adhesive thereon, said adhesive enhancing a coefficient of friction between said second element and the window frame and said third element and the window frame.

19. The mounting apparatus of claim 17 wherein said second element and said third element each include at least one prong extending therefrom, each said prong adapted to at least partially penetrate the window frame where said second element and said third element abut said window frame.

20. The compression mount of claim 10 wherein said housing has an end at an interior of said cavity, said slide including a central bore extending from said inner side of said slide toward said outer side of said slide, said spring configured as a linear compression spring interposed between said end of said housing and a portion of said central bore of said slide.

* * * * *